US006950238B2

(12) United States Patent
Tsai et al.

(10) Patent No.: US 6,950,238 B2
(45) Date of Patent: Sep. 27, 2005

(54) OPTICAL LEVELING MODULE AND METHOD FOR MANUFACTURING AN OPTICAL LEVELING LAYER THEREOF

(75) Inventors: Ming-Chiang Tsai, Tu-Chen (TW); Ga-Lane Chen, Fremont, CA (US); Chun-Yu Le, Tu-chen (TW); Tsung-Wei Chiang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/879,959

(22) Filed: Jun. 28, 2004

(65) Prior Publication Data

US 2004/0263993 A1 Dec. 30, 2004

(30) Foreign Application Priority Data

Jun. 27, 2003 (TW) ....................................... 92117596 A

(51) Int. Cl.[7] ............................................... G02B 27/10

(52) U.S. Cl. ....................... 359/619; 359/621; 359/623; 250/208.1

(58) Field of Search ................................ 359/237, 619, 359/621, 622, 623, 625, 626, 894; 250/208.1, 216, 239, 214.1

(56) References Cited

U.S. PATENT DOCUMENTS 4,425,501 A 1/1984 Stauffer
6,433,934 B1 * 8/2002 Reznichenko et al. ...... 359/622
6,507,441 B1 * 1/2003 Eisenberg et al. .......... 359/627

FOREIGN PATENT DOCUMENTS

CN 97229889 9/1999

* cited by examiner

*Primary Examiner*—Hung Xuan Dang
*Assistant Examiner*—Tuyen Tra
(74) *Attorney, Agent, or Firm*—Wei Te Chung

(57) ABSTRACT

An optical leveling module (1) includes a sensitive element (10) with a plurality of sensitive areas (11) thereon, and an optical leveling layer (20) mounted on the sensitive element and including a plurality of lenslets (21) wherein a refractive index of the lenslets progressively increases from a center of the optical leveling layer to a periphery of the optical leveling layer. The optical leveling module further includes an adjusting lens (30) and a filter (40) above the optical leveling layer. The intensity of image is essentially uniform after being adjusted by the optical leveling module. A method for manufacturing an optical leveling layer of the optical leveling module is provided. At first, enhance an optically resistant block's refractive index by doping. Second, cut it into slices. Third, each slice is etched to form a plurality of columns. Finally, each column is fused to form a lenslet.

11 Claims, 2 Drawing Sheets

LOW REFRACTIVE INDEX

HIGH REFRACTIVE INDEX

Figure 1:
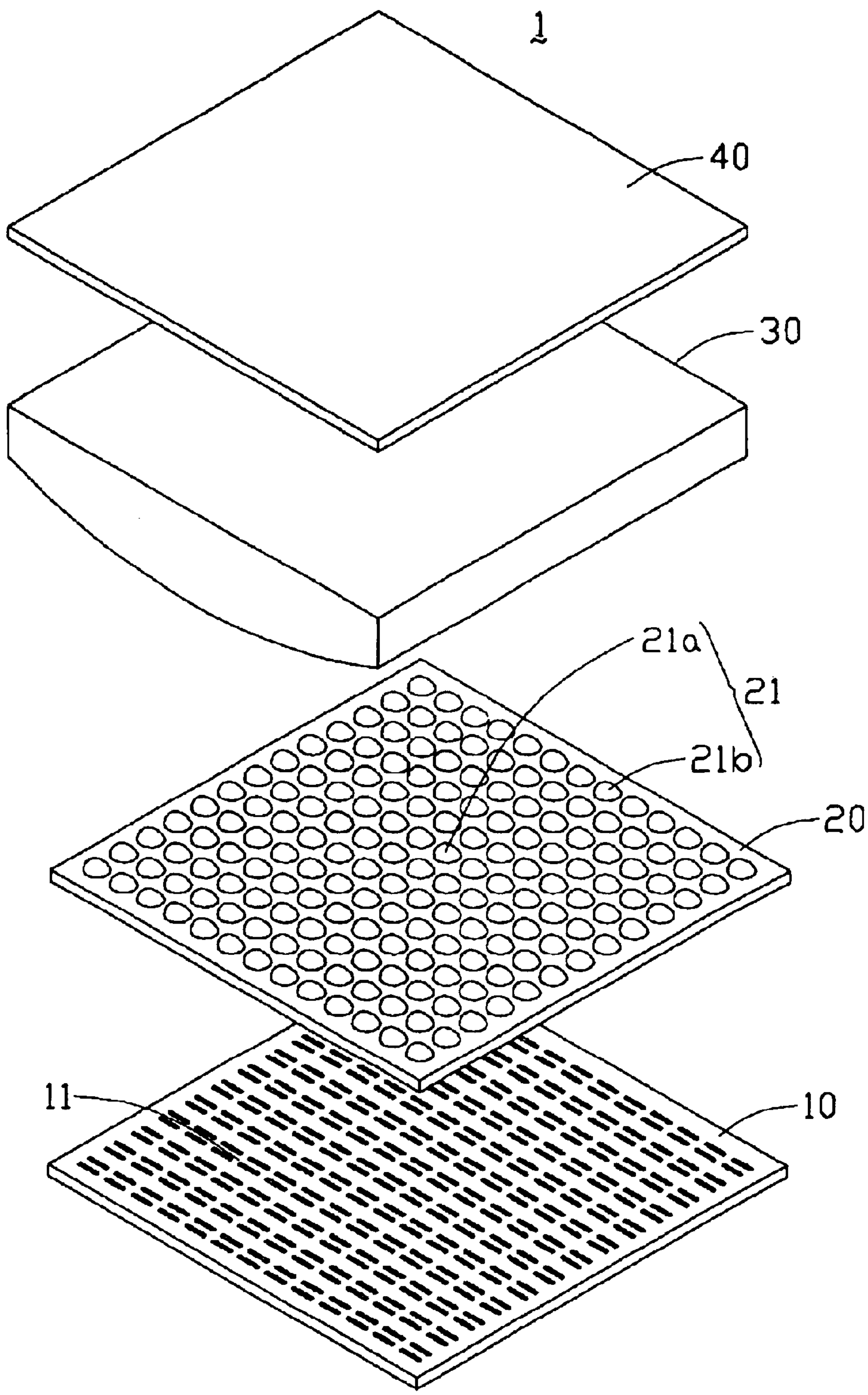

OPTICAL LEVELING MODULE AND METHOD FOR MANUFACTURING AN OPTICAL LEVELING LAYER THEREOF

BACKGROUND OF THE INVENTION

1. Field of the Invention

The present invention relates to optical leveling modules, and particularly to an optical leveling module which can adjust a light intensity distribution of an image capturing device.

2. Description of Related Art

Image definition, uniformity and trueness are conventionally important characteristics of an optical imaging device such as a digital camera. Commonly, some reduction (e.g., from 40% to 70%) in an image intensity occurs in using a camera because of vignetting or Cos4law. The image intensity at a center thereof is stronger than that at a periphery thereof.

Vignetting is when the part of an optical beam that is directed to the periphery of an image does not completely pass through the effective aperture diameter. In a typical three-lens system, said part of the optical beam is blocked by lens frames in front of and behind the aperture diameter. Cos4law defines that the peripheral image intensity is reduced in proportion to four times the cosine of the incident angle. When forming an image, vignetting can be avoided by reducing the aperture diameter. However, the Cos4law cannot be avoided by reducing the aperture diameter.

Conventionally, three kinds of means are used to adjust or compensate for the distribution of light intensity caused by the Cos4law.

The first means is adjusting the intensity of the light source. A central portion of the light source is shielded proportionately with the known unadjusted reduction in edge intensity of the image. This method is reasonably efficacious. However, it results in too much attenuation of the optical input. In addition, it adds to a height of the lens module. Furthermore, it is rather inconvenient implement.

In the second means, a transversal shelter board is disposed between the object and the image. A height of the shelter board progressively decreases from a center thereof to a periphery thereof. This controls the luminous flux, in order to compensate for the distribution of light intensity caused by the Cos4law. However, the shelter board is ordinarily made of plastic, and is formed by insert molding. It is difficult to accurately control the shape of the shelter board, which is prone to exceed acceptable tolerances. Accordingly, the resulting image after compensating is frequently unsatisfactory.

In the third means, the distribution of light intensity received by a CCD (Charge Coupled Device) image sensor or a CMOS (Complementary Metal-Oxide Semiconductor) image sensor is adjusted using a DSP (Digital Signal Processor). Accordingly, the image as recorded has a uniform distribution of intensity of illumination. However, this method complicates the circuit design of the DSP, and increases costs.

An optical leveling module of an image capturing device is disclosed in China Patent No. 97229889. The disclosure includes a lens module comprising at least one lens, an aperture diaphragm with an optical passing part, and a modulated diaphragm disposed in front of or behind a first lens of the lens module in order to shield a central portion of incoming light. Leveling of the image is attained, but at the expense of too much of the optical input being attenuated. In addition, the modulated diaphragm must be kept some distance from the image sensor; otherwise, no optical input is received by the central part of the image sensor and no image is formed. Furthermore, the form of the modulated diaphragm is limited by the form of the aperture diaphragm. As a result, the optical path can only have a limited range of configurations.

Accordingly, an new optical leveling module is desired to overcome the above problems.

SUMMARY OF THE INVENTION

An object of the present invention is to provide an optical leveling module which can effectively level the optical intensity of an image.

Another object of the present invention is to a method for manufacturing an optical leveling layer of the above-described optical leveling module.

To achieve the above object, an optical leveling module in accordance with a preferred embodiment of the present invention includes a sensitive element and an optical leveling layer. Said sensitive element has plural sensitive areas. Said optical leveling layer has plural lenslets with different refractive indices, the lenslets corresponding to the sensitive areas. The closer a lenslet is to a center of the module, the lower the refractive index of the lenslet.

The optical leveling layer is made of an optically resistant material with a gradient-index. First, the refractive index of an optically resistant block is enhanced by doping. Second, the block is cut into slices that are perpendicular to a central longitudinal axis of the block. Third, each slice is etched to form a plurality of columns. Finally, each column is fused to form a lenslet. That is, a gradient-index array of hemispherical lenslets is formed on the optical leveling layer.

Other objects, advantages and novel features of the invention will become more apparent from the following detailed description when taken in conjunction with the accompanying drawings, in which:

BRIEF DESCRIPTION OF THE INVENTION

Figure 2:
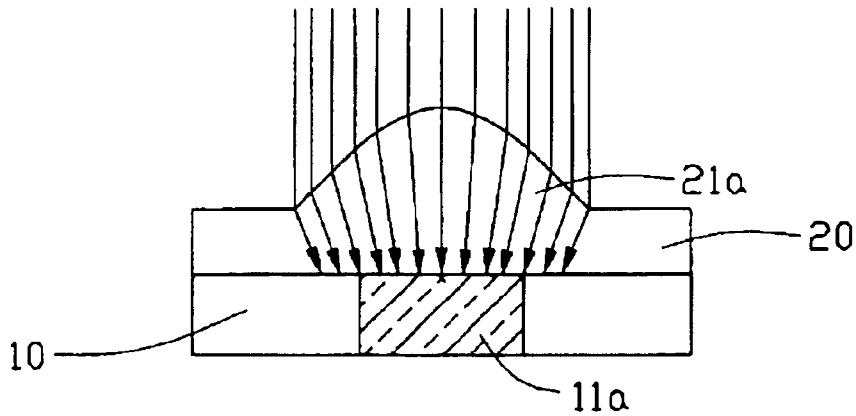
Figure 3:
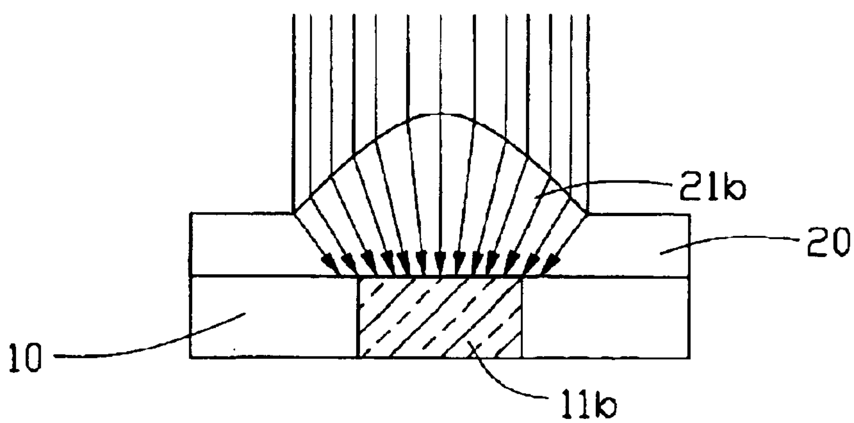

FIG. 1 is a exploded view of an optical leveling module according to the present invention; the optical leveling module comprising an optical leveling layer having a plurality of lenslets, and a sensitive element;

FIG. 2 is a side elevation optical path view of a lenslet of the optical leveling layer which is close to a center of the optical leveling module of FIG. 1, together with a corresponding part of the sensitive element; and FIG. 3 is a side elevation optical path view of a lenslet of the optical leveling layer which is distant from the center of the optical leveling module of FIG. 1, together with a corresponding part of the sensitive element.

DETAILED DESCRIPTION OF THE INVENTION

Referring to FIG. 1, an optical leveling module 1 according to the present invention has a sensitive element 10, an optical leveling layer 20, an adjusting lens 30 and a filter 40 stacked one on the other in that order. The sensitive element 10 has a plurality of sensitive areas 11 and a plurality of insensitive areas therebetween. The optical leveling layer 20 has a plurality of lenslets 21 formed thereon. The lenslets 21 correspond to the sensitive areas 11.

The lenslets 21 have different refractive indexes, which gradually vary from high at the center of the optical leveling layer 20 to low at the periphery of the optical leveling layer 20. An optical signal passes through the filter 40 and reaches the adjusting lens 30. The adjusting lens 30 turns the optical signal into a linear emission light, which ensures that the optical light normally enters the optical leveling layer 20 and is refracted by the lenslets 21 to the sensitive areas 11.

The optical leveling layer 20 is mounted on the sensitive element 10. FIG. 2 depicts one of the lenslets 21*a* at the center of the optical leveling layer 20, and a corresponding one of the sensitive areas 11*a*. FIG. 3 depicts one of the lenslets 21*b* at the periphery of the optical leveling layer 20, and a corresponding one of the sensitive areas 11*b*. The lenslets 21 of optical leveling layer 20 and the sensitive areas 11 of the sensitive element 10 have a certain fixed distance therebetween. The lenslet 21*a* has a low refractive index, and light passing therethrough focuses at a relatively distant point. The lenslet 21*b* has a high refractive index, and light passing therethrough focuses at a relatively close point. Accordingly, light flux from the lenslet 21*a* to the corresponding sensitive area 11*a* is lost much more than light flux from the lenslet 21*b* to the corresponding sensitive area 11*b*. The insensitive areas receive the lost light flux instead of the sensitive areas 11*a*, 11*b*. Thus the optical intensity of the sensitive area 11*a* is weaker than that of the sensitive area 11*b*. That is, a part of an image formed on the sensitive element 10 at the center thereof is weakened, and a part of the image at the periphery of the sensitive element 10 is relatively intensified. In another words, the intensity of the whole image is leveled throughout the sensitive element 10.

The refractive index of the optical leveling layer 20 gradually increases from the center to the periphery thereof, in order to compensate for the asymmetry of image intensity caused by vignetting and Cos4law. After being adjusted by the optical leveling module 1, the intensity of the image formed on the sensitive element 10 is essentially uniform, and the image is readily focused. Furthermore, the configuration of the optical leveling layer 20 is relatively simple.

A preferred method for manufacturing the optical leveling layer 20 is as follows. First, a block made of optically resistant material having a gradient-index of refraction is provided. The block can be made by doping by way of evaporation pressurizing, dipping, or ion exchanging. A refractive index of the block progressively increases from a center thereof to a periphery thereof. Second, the block is cut into slices that are perpendicular to a central longitudinal axis thereof. Each slice provides one gradient-index optically resistant preform of one optical leveling layer 20. Each perform is etched to form a plurality of columns thereon, corresponding to the plurality of sensitive areas 11 of the sensitive element 10. Finally, each column is fused to form a lenslet 21. That is, a gradient-index array of hemispherical lenslets 21 is formed on the optical leveling layer 20. This method is relatively easy to carry out and relatively inexpensive.

Although the present invention has been described with reference to a specific embodiment thereof, the description is illustrative and is not to be construed as limiting the invention. Various modifications to the present invention may be made to the preferred embodiment by those skilled in the art without departing from the true spirit and scope of the invention as defined by the appended claims.

We claim:

1. An optical leveling module comprising:

a sensitive element with a plurality of sensitive areas thereon; and an optical leveling layer mounted on the sensitive element and comprising a plurality of lenslets;

wherein a refractive index of the lenslets progressively increases from a center of the optical leveling layer to a periphery of the optical leveling layer.

2. The optical leveling module as claimed in claim 1, wherein the sensitive areas correspond to the lenslets.

3. The optical leveling module as claimed in claim 2, wherein the sensitive element further comprises a plurality of insensitive areas between the sensitive areas.

4. The optical leveling module as claimed in claim 3, further comprising an adjusting lens mounted above the optical leveling layer.

5. The optical leveling module as claimed in claim 4, further comprising a filter mounted above the adjusting lens.

6. A method for manufacturing an optical leveling layer for an optical leveling module, comprising the steps of:

providing a block made of optically resistant material with a gradient-index, the block made by doping;

cutting the block into slices to provide gradient-index optically resistant preforms;

etching each of the preforms to shape a plurality of columns thereon; and fusing each of the columns to form a lenslet.

7. The method as claimed in claim 6, wherein the block is doped by way of evaporation pressurizing.

8. The method as claimed in claim 6, wherein the block is doped by way of dipping.

9. The method as claimed in claim 6, wherein the block is doped by way of ion exchanging.

10. The method as claimed in claim 6, wherein the refractive index of the block progressively increases from a center thereof to a periphery thereof.

11. An optical leveling module comprising:

a sensitive element with a plurality of sensitive areas thereon; and an optical leveling layer mounted on the sensitive element and comprising a plurality of lenslets;

wherein refractive indexes of the lenslets are different in different lenslet zone.

* * * * *